United States Patent
Abusleme et al.

(10) Patent No.: US 6,706,351 B2
(45) Date of Patent: *Mar. 16, 2004

(54) MULTILAYER COMPOSITION COMPRISING FLUOROPOLYMERS AND HYDROGENATED POLYMERS

(75) Inventors: Julio A. Abusleme, Varese (IT); Claudia Manzoni, Bologna (IT)

(73) Assignee: Ausimont S.p.A., Milan (IT)

( * ) Notice: Subject to any disclaimer, the term of this patent is extended or adjusted under 35 U.S.C. 154(b) by 91 days.

This patent is subject to a terminal disclaimer.

(21) Appl. No.: 09/951,580

(22) Filed: Sep. 14, 2001

(65) Prior Publication Data

US 2002/0168529 A1 Nov. 14, 2002

(30) Foreign Application Priority Data

Sep. 18, 2000 (IT) .................................... MI2000A2028

(51) Int. Cl.$^7$ ................... B32B 1/08; B32B 25/08; B32B 27/08; B32B 27/30
(52) U.S. Cl. .................. 428/36.91; 428/411.1; 428/412; 428/413; 428/421; 428/423.1; 428/473.5; 428/474.5; 428/480; 428/500; 428/521; 428/522; 428/523; 428/532
(58) Field of Search .................. 428/36.91, 411.1, 428/412, 413, 421, 480, 423.1, 474.4, 473.5, 500, 521, 522, 523, 532

(56) References Cited

U.S. PATENT DOCUMENTS

| | | | | |
|---|---|---|---|---|
| 3,763,222 A | | 10/1973 | Aronoff et al. ................ | 560/80 |
| 3,840,619 A | | 10/1974 | Aronoff et al. ............. | 525/276 |
| 4,039,631 A | | 8/1977 | Robertson et al. .......... | 524/152 |
| 4,066,590 A | * | 1/1978 | Eldred et al. ................ | 524/289 |
| 4,121,001 A | | 10/1978 | Gotcher et al. ................ | 428/35 |
| 4,414,343 A | * | 11/1983 | Bex et al. .................... | 523/440 |
| 5,612,419 A | | 3/1997 | Arcella et al. ............. | 525/252 |
| 5,958,532 A | * | 9/1999 | Krause et al. ............. | 428/36.3 |
| 5,996,642 A | * | 12/1999 | Noone et al. ................ | 138/137 |
| 6,509,073 B1 | * | 1/2003 | Arcella et al. ........... | 428/36.91 |

* cited by examiner

Primary Examiner—Ramsey Zacharia
(74) Attorney, Agent, or Firm—Arent Fox Kintner Plotkin & Kahn

(57) ABSTRACT

A multilayer composition comprising:

A) a first layer based on copolymers of ethylene (E) with tetrafluoroethylene (TFE) and/or chorotrifluoroethylene (CTFE);

B) a second intermediate layer comprising thermoprocessable copolymers of ethylene (E) with tetrafluoroethylene (TFE) and/or chorotrifluoroethylene (CTFE) modified with acrylic monomers;

C) a third layer based on hydrogenated polymers; said multilayer composition containing in layer B) and/or in layer C) one or more crosslinking agents.

20 Claims, No Drawings

MULTILAYER COMPOSITION COMPRISING FLUOROPOLYMERS AND HYDROGENATED POLYMERS

The present invention relates to multilayer compositions comprising thermoprocessable fluoropolymers and hydrogenated polymers having improved adhesion among the single layers.

In particular the invention relates to multilayer compositions based on thermoprocessable fluoropolymers and A hydrogenated polymers, wherein the thermoprocessable fluoropolymers are copolymers of ethylene (E) with tetrafluoroethylene (TFE) and/or chlorotrifluoroethylene (CTFE). Said multilayer compositions show improved adhesion among the single layers and high chemical resistance.

The use of hydrogenated polymers in the car industry for preparing fuel hoses and fuel lines is known in the prior art. Examples of hydrogenated polymers are polyamides, polyvinylchloride (PVC), nitrile rubbers (NBR). The drawbacks of the manufactured articles obtained from said polymers are the low chemical resistance and high permeability to gasolines and oils, in particular SF oils. A high permeability to this fluids, in particular gasolines, implies a high emission of dangerous substances to the environment. The laws of most countries are more and more restrictive on these emissions due to their environmental impact. Therefore, manufactured articles having a lower permeability and an improved chemical resistance are required.

Fluorinated polymers are known, which, in comparison with hydrogenated polymers, have an improved chemical resistance to gasolines and to particularly aggressive oils used in the car industry. The drawback of fluorinated polymers is the high cost which limits the use thereof.

To make economically possible the use of fluorinated polymers it has been tried to laminate hydrogenated polymers with fluorinated polymers, for example in the preparation of fuel hoses (hydrogenated rubbers/fluorinated polymers) and fuel lines (polyamides/fluorinated polymers). However the adhesion between fluorinated polymers and hydrogenated polymers is very poor. The research is directed to find solutions such as to make it possible these laminates. This is true in particular for the thermoprocessable fluorinated copolymers of ethylene (E) with tetrafluoroethylene (TFE) and/or chlorotrifluoroethylene (CTFE), for example Halar® commercialized by Ausimont. Tests carried out by the Applicant, see the comparative Examples, have shown that the hydrogenated polymer/fluorinated polymer bilayer gives a poor adhesion or, in most cases, no adhesion among the layers of the manufactured article.

The need was therefore felt to make multilayer polymer manufactured articles having a high adhesion among the single layers, which contemporaneously show a high chemical resistance typical of fluorinated polymers and good mechanical properties when the hydrogenated polymers are thermoprocessable.

An object of the present invention is therefore a multilayer composition comprising:

A) a first layer based on copolymers of ethylene (E) with tetrafluoroethylene (TFE) and/or chlorotrifluoroethylene (CTFE), preferably CTFE;

B) a second intermediate layer based on thermoprocessable copolymers of ethylene (E) with tetrafluoroethylene (TFE) and/or chlorotrifluoroethylene (CTFE) modified with acrylic monomers of formula:

$CH_2$=CH—CO—O—$R_2$      (a)

$R_2$ is a $C_1$–$C_{20}$ hydrogenated radical from 1 to 20 carbon atoms, linear and/or branched alkyl radical or cycloalkyl radical, or $R_2$ is H. The $R_2$ radical can optionally contain: heteroatoms preferably Cl, O, N; one or more functional groups preferably selected from OH, COOH, epoxide, ester and ether;

C) a third layer based on hydrogenated polymers;
said multilayer composition containing in layer B) and/or in layer C) one or more crosslinking agents of fluorinated polymers.

The copolymers of layer A) contain:
from 30 to 60% by moles, preferably from 40 to 50% of ethylene;
from 40 to 70% by moles, preferably from 50 to 60% of a fluorinated monomer selected from tetrafluoroethylene, chlorotrifluoroethylene, or mixtures thereof;
optionally from 0.1 to 5% by moles referred to the sum of the previous monomers of a fluorinated monomer selected from perfluoroalkylvinylethers, preferably perfluoropropylvinylether (PPVE), perfluorodioxoles, hexafluoroisobutene.

The thermoprocessable copolymers of layer B) are formed by:
from 10 to 70% by moles, preferably from 35 to 55% of ethylene;
from 30 to 90% by moles, preferably from 45 to 65%, of a fluorinated monomer selected from tetrafluoroethylene, chlorotrifluoroethylene, or mixtures thereof, preferably CTFE;
from 0.1 to 30% by moles, preferably from 1 to 15% by moles of the acrylic comonomer (a) referred to the sum of the previous monomers.

The acrylic monomers of formula (a) are preferably n-butylacrylate.

Optionally layer B) comprises also the thermoprocessable copolymers of layer A) in an amount from 0 to 95% by weight, preferably from 70 to 95% by weight with respect to the copolymers of layer B), with the proviso that layer B) contains an amount of acrylic monomers of formula (a) of at least 0.1% by moles. It has been found by the Applicant that when in layer B) a blend of the copolymers of A) and B) is used and the final amount of the comonomer of formula a) in the blend is lower than 0.5% by moles, then the multilayer can be made without using layer A), yet substantially maintaining the multilayer properties.

The hydrogenated polymers of layer C) are of both thermoprocessable and elastomeric type, preferably thermoprocessable. Among thermoprocessable polymers, hydrocellulose polymers, polyamides as NYLON 6, NYLON 66, NYLON 11, NYLON 12, polyamide copolymers, polycarbonates, polyesters, such as for example polyethylenterephthalate, polyolefins such as for example high and low density polyethylene, olefine copolymers, polyimides, polystyrene, polyurethanes, polyvinylchloride (PVC), polysulphones, ethylene/vinylacetate copolymers, polyacrylobutadienestyrene (ABS), can be mentioned.

As hydrogenated elastomers we can mention acrylic rubbers, nitrile rubbers (NBR), ethylene-propylene rubbers (EPM), ethylene-propylene-diene rubbers (EPDM), NVC rubbers (nitrile NBR rubbers mixed with PVC), epichlorohydrin rubbers (CO and ECO).

The preferred thermoprocessable hydrogenated polymers are polyesters, polyolefins, polyamides.

The preferred hydrogenated elastomers are epichlorohydrin and nitrile rubbers (NBR).

The crosslinking agents used in the multilayer composition of the invention can be of both radical and ionic type and they are those well known and conventionally used in the crosslinking of fluorinated polymers.

As radical crosslinking agents we can mention triallylisocyanurate (TAIC), triallylcyanurate (TAC), diallylisophthalate (U.S. Pat. No. 4,039,631), diallylterephthalate (U.S. Pat. No. 4,039,631), esters of phenyl indan (U.S. Pat. No. 3,763,222), triallylester of the aryl polycarboxylic acid (U.S. Pat. No. 3,840,619), bis-olefins such as for example 1,6 divinylperfluorohexane (see U.S. Pat. No. 5,612,419) and others (see U.S. Pat. No. 4,121,001). Among the radical crosslinking agents, triallylisocyanurate is preferred. Preferably the radical crosslinking agent is used in combination with a peroxide, for example Luperco® 101 XL (2,5-dimethyl-2,5-di(terbutylperoxy)hexane 45% by weight based on inert support), dicumylperoxide and terbutylhydroperoxide. In this case when the peroxide is present in layer C), the crosslinking agent is present in layer B), or viceversa.

As ionic crosslinking agents, we can mention those of amine type, for example hexamethylendiaminecarbamate, N,N'-dicinnamylidene-1,6 hexanediamine, maleimides derivatives, such for example m-phenylenbismaleimide, $C_4$–$C_{20}$ aliphatic diamines, or polyhydroxyl aromatic compounds, for example bisphenols, A, AF and S, preferably in combination with a crosslinking accelerator, for example ammonium or phosphonium salts, preferably tetralkyl salts, for example tetrabutyl or phosphoranamines salts. In this case when the polyhydroxyl aromatic compounds are present in layer C), the accelerator is present in layer B), or viceversa. Preferably the accelerator is in layer C). The molar ratio between the accelerator and the polyhydroxyl aromatic compounds generally ranges between 1:5 and 1:1.

Among the ionically active crosslinking agents, both aliphatic and aromatic protected diamines are preferred. Preferably amines are used in layer C).

The crosslinking agent amount can range from 0.1 to 20.0% by weight, preferably from 0.5 to 10.0% by weight, more preferably from 1.0 to 5.0% by weight with respect to the polymer.

The multilayer compositions of the invention can furthermore contain one or more optional ingredients such as fillers (for example polytetrafluoroethylene (PTFE), silicates), "smoke retarders", lubricants, pigments, "fire retardants", "intumescent agents", plasticizers (for example MORFLEX® 560), metal oxides (ZnO, MgO), inorganic bases (Ca(OH)$_2$), thermal stabilizers such as for example Irganox® 1010.

The maximum total amount of said optional components is in the range 0 and 30% by weight.

The multilayer composition of the present invention can be obtained by co-extrusion of layers A), B) and C). An alternative method is the compression of the single layers at the softening temperature of the components. Preferably the co-extrusion method is used.

From the multilayer compositions of the invention manufactured articles are obtained, for example fuel lines obtained by co-extrusion of polyamide (layer C) and of layers A) and B) of the invention, fuel hoses obtained for example by extrusion of a hydrogenated rubber (layer C) on a tube formed by co-extruded layers A) and B).

The multilayer manufactured articles A/B/C obtainable from the compositions of the invention show the following combination of properties:

high chemical resistance when in contact layer A) of the multilayer with aggressive fluids;
good mechanical properties;
very good adhesion among the single layers, wherefore the manufactured articles are completely integrated.

Some embodiment examples of the present invention are hereinafter reported, the purpose of which is merely illustrative but not limitative of the scope of the invention itself.

EXAMPLES

Example 1

Preparation of the Copolymer of Layer A (E/CTFE 49/51 by Moles %)

5.3 l of demineralized water, 1.7 l of methyl alcohol, 52 ml of methylcyclopentane and 2 Kg of chlorotrifluoroethylene were fed into an enamelled autoclave equipped with baffles and stirrer working at 450 rpm in Hastelloy C. The autoclave was then heated to the reaction temperature of 15° C. and ethylene was fed up to a pressure of 12.6 absolute bar.

In the autoclave the radical initiator was then introduced with a flow-rate of 40 ml/h for the whole polymerization under the form of a trichloroacetylperoxide (TCAP) solution in isooctane, maintained at −17° C., having a titre equal to 0.12 g TCAP/ml.

The pressure was maintained constant during the whole polymerization, by continuously feeding of ethylene to the reactor up to a consumption of 200 g; in total 200 ml of initiator solution were introduced.

The product discharged from the autoclave was dried at 120° C. for about 16 hours. The amount of the obtained dry product was 1507 g.

The obtained polymer was compounded with optional components such as MARK-260® in an amount of 0.45% by weight and Aclyn-316® in an amount of 0.15% by weight both mainly used as thermal stabilizers. Then the compounded product is pelletized in a single screw Brabender extruder in Hastelloy C-276 having a 18 mm diameter and a length equivalent to 25 times the diameter, with a melt temperature of 270° C. Plaques having a 1.5 mm thickness are obtained by compression moulding from the granules.

Preparation of the Copolymer of Layer B (E/CTFE/n-BuA 40/55/5 by Moles %)

5.3 l of demineralized water, 1.7 l of methyl alcohol, 20 ml of methylcyclopentane, 10 g of n-butylacrylate and 2 Kg of chlorotrifluoroethylene were fed into an enamelled autoclave equipped with baffles and stirrer working at 450 rpm in Hastelloy C. The autoclave was then heated to the reaction temperature of 15° C. and ethylene was fed up to a pressure of 8.2 absolute bar. In the autoclave the radical initiator was then continuously fed for the whole polymerization under the form of a trichloroacetylperoxide (TCAP) solution in isooctane, maintained at −17° C., having a titre equal to 0.1 g TCAP/ml. Furthermore, 10 g of n-butylacrylate were introduced at consumption of 20, 40, 60, 80, 100, 120, 140, 160 and 180 g of ethylene, for a total of 100 g of n-butylacrylate introduced, comprising the initially fed amount.

The pressure was maintained constant for the whole polymerization, by continuously feeding of ethylene to the reactor up to a consumption of 200 g; in total 399 ml of initiator solution were introduced. The whole polymerization lasted 555 minutes.

The product discharged from the autoclave was dried at 120° C. for about 16 hours. The amount of the obtained dry product was 1200 g.

The obtained polymer was compounded with optional components such as MARK-260® in an amount of 0.45% by weight and Aclyn-316® in an amount of 0.15% by weight both mainly used as thermal stabilizers. Then the compounded product is pelletized in a single screw Brabender extruder in Hastelloy C-276 having a 18 mm diameter and a length equivalent to 25 times the diameter, with a melt temperature of 240° C. Plaques having a 1.5 mm thickness are obtained by compression moulding from the granules.

Preparation of the Polymer of Layer C

1 Kg of Nylon 12 under the form of granules was compounded with 4% by weight of hexamethylendiamine monocarbamate. Then it was pelletized in a single screw Brabender extruder in Hastelloy C-276 having a 18 mm diameter and a length equivalent to 25 times the diameter, with a melt temperature of 225° C. Plaques having a 1.5 mm thickness are obtained by compression moulding from the granules.

Preparation of Multilayer A/B/C

The previously obtained plates of the single layers have been overlapped in the A/B/C order, and kept under pressure at a temperature of 270° C. for 10 minutes.

By applying mechanical stress one tries to separate layer A from layer C of the multilayer A/B/C.

One cannot measure the force of delamination between the layers A and C, since there is an adhesion between the layers such to prevent the separation thereof. By increasing the applied force for separating the layers, one succeeds in breaking the manufactured article without obtaining the delamination. This shows that the multilayer of the invention has a high adhesion among the single layers.

The chemical resistance of the multilayer A/B/C is given by the high chemical resistance of layer A, which is put into contact with toluene at different temperatures. The variation by weight of the polymer forming layer A is evaluated:

| Temperature | Variation by weight |
|---|---|
| 30° C. | 3.5% |
| 50° C. | 4.0% |
| 75° C. | 5.0% |
| 100° C. | 7.2% |

These data show a limited variation by weight, also at high temperatures, wherefore the chemical resistance of the multilayer is high and imparted by layer A.

Example 2

Preparation of the Copolymer of Layer A
(E/CTFE/PPVE 48.9/50.0/1.1 by Moles %)

45.6 l of demineralized water were fed to a 30 gallons Pfaudler type enamelled autoclave, equipped with stirrer working at 350 rpm. The autoclave was pressurized with nitrogen and subsequently evacuated. 13.6 kg of methanol, 100 ml of chloroform, 4.0 kg of perfluoropropylvinylether (PPVE) and 22.7 kg of chlorotrifluoroethylene (CTFE) were then introduced. The reactor was brought to 5° C. and then pressurized with ethylene up to an internal pressure of 13.4 absolute bar was reached. In the autoclave the radical initiator was then gradually introduced formed by a trichloroacetylperoxide (TCAP) solution in CFC-113, maintained at −17° C., having a concentration equal to 0.09 g/ml. In total 59.6 g of TCAP were fed. The working pressure was approximately maintained constant during the reaction by continuously feeding of ethylene. After 235 minutes, the reaction was stopped. 10.4 kg of dry polymer were obtained.

Preparation of the Polymer of Layer B

The same copolymer of Example 1 is used.

Preparation of the Polymer of Layer C

The same hydrogenated polymer of Example 1 is used.

Preparation of Multilayer A/B/C

The previously obtained plates of the single layers have been overlapped in the A/B/C order, and kept under pressure at a temperature of 270° C. for 10 minutes.

By applying mechanical stress one tries to separate layer A from layer C of the multilayer A/B/C.

One cannot measure the force of delamination between the layers A and C, since there is an adhesion between the layers such to prevent the separation thereof. This shows that the multilayer of the invention has a high adhesion among the single layers.

The chemical resistance of multilayer A/B/C is given by the high chemical resistance of layer A, which is put into contact with toluene at different temperatures. The variation by weight of the polymer forming layer A is evaluated:

| Temperature | Variation by weight |
|---|---|
| 30° C. | 4.5% |
| 50° C. | 5.5% |
| 75° C. | 7.6% |
| 100° C. | 11.8% |

These data show a limited variation by weight also at high temperatures, wherefore the chemical resistance of the multilayer is high and imparted by layer A.

Example 3

Preparation of the Polymer of Layer A

The same copolymer of Example 1 is used.

Preparation of the Polymer of Layer B 100 g in granules of the copolymer of layer B of Example 1 are mixed with 900 g in granules of the copolymer of layer A of Example 1. Then the blend is pelletized in a single screw Brabender extruder in Hastelloy C-276 having a 18 mm diameter and a length equivalent to 25 times the diameter, with a melt temperature of 270° C. Plaques having a 1.5 mm thickness are obtained by compression moulding from the granules.

Preparation of the Polymer of Layer C

The same hydrogenated polymer of Example 1 is used.

Preparation of Multilayer A/B/C

The previously obtained plaques of the single layers have been overlapped in the A/B/C order, and kept under pressure at a temperature of 270° C. for 10 minutes.

By applying mechanical stress one tries to separate layer A from layer C of multilayer A/B/C.

One cannot measure the force of delamination between the layers A and C, since there is an adhesion between the layers such to prevent the separation thereof. This shows that the multilayer of the invention has a high adhesion among the single layers.

Example 4 (Comparative)

A bilayer composition A/C is prepared by using the plaques A and C obtained in Example 1. The plates are overlapped and kept under pressure at a temperature of 270° C. for 10 minutes.

The composition A/C does not show any adhesion among its components.

This Example shows that in absence of the intermediate layer B) it is not possible to obtain a manufactured article formed by A) and C) having the properties of high chemical resistance (given by layer A) and of good mechanical properties (given by layer C).

What is claimed is:

1. A multilayer composition comprising:
   A) a first layer consisting of copolymers of ethylene (E) with tetrafluoroethylene (TFE) and/or chlorotrifluoroethylene (CTFE);
   B) a second intermediate layer comprising thermoprocessable copolymers formed by:
      from 10 to 70% by moles, ethylene;
      from 30–90% by moles of a fluorinated monomer selected from tetrafluoroethylene or chlorotrifluoroethylene
      from 0.1 to 30% by moles referred to the sum of the previous monomers, of acrylic monomers of formula $$CH_2=CH-CO-O-R_2 \qquad (a)$$

$R_2$ is a $C_1$–$C_{20}$ hydrogenated radical from 1 to 20 carbon atoms, linear and/or branched, alkyl or cycloalkyl radical, optionally containing heteroatoms; one or more functional groups selected from OH, COOH, epoxide, ester and ether; or $R_2$ is H;
   C) a third layer based on hydrogenated polymers;
      said multilayer composition containing in layer B) and/or in layer C) one or more crosslinking agents.

2. A multilayer composition according to claim 1, wherein the copolymer of layer A) contain:
   from 30 to 60% by moles of ethylene;
   from 40–70% by moles of a fluorinated monomer selected from tetrafluoroethylene and/or chlorotrifluoroethylene;
   optionally from 0.1 to 5% by moles referred to the sum of the previous monomers of a fluorinated monomer selected from the group consisting of perfluoroalkylvinylethers, perfluorodioxoles, and hexafluoroisobutene.

3. A multilayer composition according to claim 1, wherein layer B) comprises also the thermoprocessable copolymers of layer A) in an amount from 70 to 95% by weight with respect to the copolymers of layer B), with the proviso that layer B) contains an amount of acrylic monomers of formula (a) at least 0.1% by moles.

4. A multilayer composition according to claim 1, wherein the hydrogenated polymers of layer C) are thermoprocessable or electrometric.

5. A multilayer composition according to claim 4, wherein the thermoprocessable hydrogenated polymers are selected from the group consisting of hydrocellulose polymers, polyamides, polyamide copolymers, polycarbonates, polyesters, polyolefins, polyimides, polystyrene, polyurethanes, polyvinylchloride (PVC), polysulphones, ethylene/vinylacetate copolymers, and polyacrylobutadienestyrene (ABS).

6. A composition according to claim 5 wherein the thermoprocessable hydrogenated polymers are selected from polyesters, polyolefins and polyamides.

7. A multilayer composition according to claim 4, wherein the hydrogenated elastomers are selected from the group consisting of acrylic rubbers, nitrile rubbers (NBR), ethylene-propylene rubbers (EPM), ethylene-propylenediene rubbers (EPDM), nitrile rubbers mixed with PVC (NVC), and epichlorohydrin rubbers (CO and ECO).

8. A multilayer composition according to claim 1, wherein the crosslinking agents are radical or ionic.

9. A multilayer composition according to claim 8, wherein the radical crosslinking agents are selected from the group consisting of triallylisocyanurate (TAIC), triallylcyanurate (TAC), diallylisophthalate, diallylterephthalate, esters of phenyl indan, triallylester and the aryl polycarboxylic acid, and bisolefins.

10. A multilayer composition according to claim 8, wherein the radical crosslinking agent is used in combination with a peroxide.

11. A multilayer composition according to claim 10, wherein when the peroxide is present in layer C), the crosslinking agent is present in layer B), or vice versa.

12. A multilayer composition according to claim 8, wherein the ionic crosslinking agents are selected from the group consisting of amine, maleimides derivatives, $C_4$–$C_{20}$ aliphatic diamines, and polyhydroxyl aromatic compounds optionally in combination with a crosslinking accelerator selected from the group consisting of ammonium salts, phosphonium salts, and phosphoranamine salts.

13. A multilayer composition according to claim 12, wherein the ionic crosslinking agents are aliphatic or aromatic protected diamines.

14. A multilayer composition according to claim 12, wherein amines are used in layer C).

15. A multilayer composition according to claim 8, wherein the amount of crosslinking agents ranges from 0.1 to 20.0% by weight with respect to the polymer.

16. A multilayer composition according to claim 1 obtainable by co-extrusion of layers A), B) and C).

17. Manufactured articles obtainable from the multilayer compositions of claim 1.

18. Manufactured articles according to claim 17, wherein the articles are selected from the group consisting of fuel lines and fuel hoses.

19. A multilayer composition comprising the following layers:
   B) as defined in claim 1, comprising also the thermoprocessable copolymers of layer A) in an amount from 70 to 95% by weight with respect to the copolymers of layer B), with the proviso that layer B) contains an amount of acrylic monomers of formula (a) less than 0.5% by moles;
   C) as defined in claim 1; said multilayer composition containing in layer B) and/or in layer C) one or more crosslinking agents.

20. A multilayer composition according to claim 1 in which the crosslinking agents in layer C) are aliphatic or aromatic protected diamines.

* * * * *